(12) United States Patent
Sasaki

(10) Patent No.: US 7,071,668 B2
(45) Date of Patent: Jul. 4, 2006

(54) POWER CIRCUIT AND METHOD FOR CONTROLLING SAME

(75) Inventor: Hiroshi Sasaki, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 491 days.

(21) Appl. No.: 10/367,813

(22) Filed: Feb. 19, 2003

(65) Prior Publication Data

US 2003/0164644 A1 Sep. 4, 2003

(30) Foreign Application Priority Data

Feb. 21, 2002 (JP) .............................. 2002-045219

(51) Int. Cl.
*G05F 1/56* (2006.01)
*G05F 1/618* (2006.01)
*H02J 7/00* (2006.01)

(52) U.S. Cl. .................... 323/290; 323/286; 323/289

(58) Field of Classification Search ................ 323/286, 323/289, 290
See application file for complete search history.

(56) References Cited

U.S. PATENT DOCUMENTS

| 6,486,567 | B1 * | 11/2002 | Sano et al. | .................... 307/32 |
| 6,760,203 | B1 * | 7/2004 | Usui | ........................... 361/18 |
| 6,858,335 | B1 * | 2/2005 | Schmidt et al. | ............... 429/13 |
| 6,898,090 | B1 * | 5/2005 | Nishida et al. | ............... 363/19 |
| 2004/0075423 | A1 * | 4/2004 | Itabashi et al. | ............. 323/282 |

* cited by examiner

*Primary Examiner*—Brian Sircus
*Assistant Examiner*—Hal I. Kaplan
(74) *Attorney, Agent, or Firm*—Whitham, Curtis, Christofferson & Cook, PC

(57) ABSTRACT

A power circuit is provided which has a small current peak value from a power source even when a load current repeats periodically, and a burst flow in a burst period and a non-burst flow in a non-burst period alternates. The power circuit includes a power source section, a power controlling section, and an energy storing section having a storage capacitor being connected to an output terminal, a current controlling circuit to control values of detecting a voltage input from a power source section and a control switching device having a field effect transistor switch and a circuit made up of a capacitor in which a flowing period of an output current is controlled by exerting the field effect transistor switch according to a control signal being produced by detecting a change in an input power voltage using a voltage occurring at another terminal of the detecting resistor.

24 Claims, 8 Drawing Sheets

POWER CIRCUIT AND METHOD FOR CONTROLLING SAME

BACKGROUND OF THE INVENTION

1. Field of the Invention

The present invention relates to a power circuit and a method for controlling the power circuit being capable of making a peak value of a source current adapted to supply source power to a load in which its power consumption changes periodically and of allowing an amount of a current drain to exceed an upper limit value within a set period of time.

The present application claims priority of Japanese Patent Application No. 2002-045219 filed on Feb. 21, 2002, which is hereby incorporated by reference.

2. Description of the Related Art

In recent years, as terminals of portable devices become multifunctional to achieve connections or access to the Internet, distribution of moving pictures, or a like, both a transmission speed and an amount of data communications tend to increase. Moreover, it is essential that these terminals of portable devices be made not only multifunctional but also smaller and more lightweight from a viewpoint of convenience for use.

On the other hand, as terminals of portable devices become multifunctional, an amount of power being consumed tends to increase and therefore it is required that a cell being used as a power source has a large capacity. However, such a large capacity of a cell serving as a power source leads to a larger scale of and a larger weight of terminals of portable devices, which become contradictory to a demand for being made smaller and lightweight being required for terminals of portable devices to improve performance.

To satisfy such contradictory demands in terminals of portable devices, a cell having higher energy density or having lower internal impedance is being developed, however, such presently available contrivance does not achieve a satisfactory result. Moreover, development of technology to enhance discharge efficiency of a cell is being subject to review. In the case of terminals of portable devices, in many cases, performance of a cell is evaluated by using operating time of portable devices as a specified value. Here, the operating time refers to elapsed time during which portable devices can be operated normally and is defined as time being elapsed before a voltage of the cell reaches a lowest value of a voltage that can drive portable devices.

To improve discharge efficiency of a cell, matching between a lowest voltage that can drive the above portable devices and a voltage that terminates discharge of the cell is effective and therefore methods which enable portable devices to be operated at a low voltage by using a DC—DC (direct current to direct current) converter circuit or the like as a power source and which enable calibration of a discharge terminating voltage of a cell by optimizing a number of serial cells are conventionally employed.

However, in the case of such portable devices in which their loads vary with time which is specific to digital devices prevailing in recent years as devices operating according to a TDMA (Time Division Multiple Access) method, digital data transfer systems, or likes, since their cell voltage changes over time, matching between the lowest driving voltage and the discharge terminating voltage becomes difficult and therefore a conventional power source circuit has a problem in that it cannot operate a cell fully effectively.

Moreover, in the case of devices being supplied with source power from a personal computer, or the like, serving as a host according to a USB (Universal Serial Bus) with specifications for the Internet, there is a problem in that, since an upper limit is imposed on a current that can be employed in the USB, devices that consume a current exceeding the upper limit can not be used.

Thus, a conventional power circuit presents a problem in that effective use of a cell serving as a power source is impossible and devices consuming a current exceeding such a limit value cannot be used.

SUMMARY OF THE INVENTION

In view of the above, it is an object of the present invention to provide a power circuit and a method for controlling the power circuit that enables effective use of a cell serving as a source of power and that is capable of powering devices consuming a current exceeding a limit value.

According to a first aspect of the present invention, there is provided a power circuit for feeding a load current to a load in which the load current repeats periodically and alternately a burst flow in a burst period and a non-burst flow in a non-burst period including:

a power source section made up of a direct current power source whose one terminal is connected to a negative polarity;

a source power controlling section to control a current fed from the power source section being connected to an input terminal and to feed the current to a load being connected to an output terminal;

an energy storing section having a storage capacitor being connected between the output terminal and a negative polarity; and wherein the source power controlling section is provided with a current controlling circuit to control a resistance value of a detecting resistor whose one terminal is connected to the negative polarity according to a result of detection of a voltage input from the power source section and a switching circuit which has a circuit part made up of a switching device being connected between an input terminal and an output terminal and a capacitor being connected between the output terminal and a negative polarity and which controls a flowing period of an output current by exerting control on the switching device according to a control signal being produced by detecting a change in an input power voltage using a voltage value occurring at another terminal of the detecting resistor.

According to a second aspect of the present invention, there is provided a power circuit for feeding a load current to a load in which the load current repeats periodically and alternately a burst flow in a burst period and a non-burst flow in a non-burst period including:

a power source section made up of a direct current power source whose one terminal is connected to a negative polarity;

a source power controlling section to control a current fed from the power source section being connected to an input terminal and to feed the current to a load being connected to an output terminal;

an energy storing section having a storage capacitor being connected between the output terminal and a negative polarity; and wherein the source power controlling section is provided with a current controlling circuit to control a resistance value of a detecting resistor whose one terminal is connected to the negative polarity according to a result of detection of a voltage input from the power source section and a switching circuit which has a step-up DC—DC converter circuit made up of a voltage detecting circuit to detect a voltage of an output terminal, a coil and a diode connected in series between an input terminal and an output terminal, a capacitor connected between the output terminal and a negative polarity and a switching device connected between a connecting point between the coil and the diode and another terminal of the detecting resistor and which controls a flowing period of an output current by exerting control on the switching device according to a control signal produced by a signal that detects a change in a current of the switching device using a voltage value at the other terminal of the detecting resistor and by a signal that detects a voltage at the output terminal.

According to a third aspect of the present invention, there is provided a power circuit for feeding a load current to a load in which the load current repeats periodically and alternately a burst flow in a burst period and a non-burst flow in a non-burst period including:

a power source section made up of a direct current power source whose one terminal is connected to a negative polarity;

a source power controlling section to control a current fed from the power source section being connected to an input terminal and to feed the current to a load being connected to an output terminal;

an energy storing section having a storage capacitor being connected between the output terminal and a negative polarity; and wherein the source power controlling section is provided with a current controlling circuit to control a resistance value of a detecting resistor whose one terminal is connected to an input terminal according to a result of detection of a voltage input from the power source section and a switching circuit which has a step-down DC—DC converter circuit made up of a voltage detecting circuit to detect a voltage of an output terminal, a switching device and a coil connected in series between another terminal of the detecting resistor and an output terminal, a capacitor connected between the output terminal and the negative polarity and a diode connected between and the negative polarity and a connecting point between the switching device and the coil, and which controls a flowing period of an output current by exerting control on the switching device according to a control signal produced by a signal that detects a change in an input current using a voltage across the detecting resistor and by a signal that detects a voltage at the output terminal.

In the foregoing, a preferable mode is one wherein a circuit constant of the source power controlling section, electro-static capacity and internal resistance of the storage capacitor are determined by following equations:

$$T1+T2 \leq Tload$$

where "T1+T2" denotes a flowing period (Sec) of a power current and "Tload" denotes a load period (Sec).

$$Vo/2 \geq IC \times \{Rc+(Tload \times Don)/(C \times 100)\} = Vo3$$

where "Vo" denotes a voltage (V) of the storage capacitor occurring when there is no load current, "IC" denotes a current (A) of the storage capacitor, "Rc" denotes an internal resistance (Ω) of the storage capacitor, "Don" denotes a duty ratio (%) of a load, "C" denotes a capacity (F) of a storage capacitor, and "Vo3" denotes an amount of a voltage drop (V) of a storage capacitor voltage occurring during a burst period.

Also, a preferable mode is one wherein the power source section is made up of a secondary cell being connected between an output terminal and the negative polarity and being connected to a charging power source through a charging circuit, and of a primary cell being connected to the output terminal and the negative polarity through a charging preventing circuit used to prevent charging caused by an output from the charging power source.

Also, a preferable mode is one wherein the power source section is made up of a secondary cell being connected between an output of a charging circuit and the negative polarity and being connected to an output terminal through a charging preventing switch and of a primary cell being connected between the output terminal and the negative polarity.

Also, a preferable mode is one wherein the power source section is made up of a fuel tank, a fuel cell to generate power using fuel fed from the fuel tank, and a direct current smoothing controlling section to stabilize a voltage output from the fuel cell and to feed it to an output terminal.

Also, a preferable mode is one wherein the power source section is made up of a current setting resistor to set a value of an output current, an operational amplifier to amplify a detected voltage of the current setting resistor, and a switching circuit to control a power current according to an output of the operational amplifier.

Also, a preferable mode is one wherein a storage capacitor in the energy storing section is made up of an electric double layer capacitor.

Furthermore, a preferable mode is one wherein the storage capacitor has a capacitor discharging circuit used to cause a charge of the storage capacitor to be shorted through a discharging resistor when a predetermined condition is detected by comparing a terminal voltage of the storage capacitor with a power voltage.

According to a fourth aspect of the present invention, there is provided a method for controlling a power circuit to feed a load current to a load in which the load current repeats periodically and alternately a burst flow in a burst period and a non-burst flow in a non-burst period which has a power source section made up of a direct current power source whose one terminal is connected to a negative polarity, a source power controlling section to control a current fed from the power source section being connected to an input terminal and to feed the current to a load being connected to an output terminal, and an energy storing section having a storage capacitor being connected between the output terminal and a negative polarity, the method including:

a step of controlling a resistance value of a detecting resistor whose one terminal is connected to the negative polarity resulting from detecting a voltage input from the power source section; and a step of controlling a flowing period of an output current by exerting control on a switching device according to a control signal being produced by detecting a change in an input power voltage using a voltage value occurring at another terminal of the detecting resistor in a circuit being made up of a switching circuit having a switching device being connected between an input terminal and an output terminal and a capacitor being connected between the output terminal and a negative polarity.

According to a fifth aspect of the present invention, there is provided a method for controlling a power circuit to feed a load current to a load in which the load current repeats periodically and alternately a burst flow in a burst period and a non-burst flow in a non-burst period which has a power source section made up of a direct current power source whose one terminal is connected to a negative polarity, a source power controlling section to control a current fed from the power source section being connected to an input terminal and to feed the current to a load being connected to an output terminal, and an energy storing section having a storage capacitor being connected between the output terminal and a negative polarity, the method including:

a step of controlling a resistance value of a detecting resistor whose one terminal is connected to the negative polarity resulting from detecting a voltage input from the power source section; and a step of controlling a flowing period of an output current by exerting control on the switching device according to a control signal produced by a signal that detects a change in a current of the switching device using a voltage value at another terminal of the detecting resistor and by a signal that detects a voltage at the output terminal in a step-up DC—DC converter circuit made up of a coil and a diode connected in series between an input terminal and an output terminal, a capacitor connected between the output terminal and a negative polarity and a switching device connected between a connecting point between the coil and the diode and the other terminal of the detecting resistor.

According to a sixth aspect of the present invention, there is provided a method for controlling a power circuit to feed a load current to a load in which the load current repeats periodically and alternately a burst flow in a burst period and a non-burst flow in a non-burst period which has a power source section made up of a direct current power source whose one terminal is connected to a negative polarity, a source power controlling section to control a current fed from the power source section being connected to an input terminal and to feed the current to a load being connected to an output terminal, and an energy storing section having a storage capacitor being connected between the output terminal and the negative polarity, the method including:

a step of controlling a resistance value of a detecting resistor whose one terminal is connected to an input terminal according to a result of detection of a voltage input from the power source section; and a step of controlling a flowing period of an output current by exerting control on the switching device according to a control signal produced by a signal that detects a change in an input current using a voltage across the detecting resistor and by a signal that detects a voltage at the output terminal in a step-down DC—DC converter circuit made up of a switching device and a coil connected in series between another terminal of the detecting resistor and an output terminal, a capacitor connected between the output terminal and the negative polarity, and a diode connected between a connecting point between the switching device and the coil and the negative polarity.

With the above configurations, in the power circuit having a direct current power source as a power source, by placing an energy storing section on an output side of the current limiting section adapted to exert output current control and output voltage control in order to accommodate a change in the load current, even in the case of a load in which its current flows periodically and alternately in a burst-period and a non-burst period, a peak value of a power current can be made smaller. By making a peak value of a power current, in the case where the power source section is a cell, discharging life of the cell can be extended. Moreover, even in the case of a power source whose output current has an upper limit value, in the case of a load in which, though power consumption exceeds an upper limit value only during a burst period, average power consumption is less than power supplied from the power source, the power circuit can be driven. Moreover, in the case where the load, though consuming a constant power in an ordinary manner, provides a current pattern in which a burst period and a non-burst period occur alternately and periodically, since an upper limit value of a set current can be changed automatically according to a power voltage, even if the load consumes constant power, so long as it is a periodical pulse, the effect described above can be obtained.

Thus, the present invention is related to the power circuit and the method for controlling the power circuit which can be suitably employed in a case in which a chemical cell or a power source whose output current has its upper limit value is used when a load such as a TDMA-type portable cellular phone is to be driven in which power consumption changes periodically. The TDMA communication method includes a PDC (Personal Digital Cellular) method, a GSM (Global System for Mobile Communication), a GPRS (General Packet Ratio Service) or a like.

In the TDMA-type portable cellular phone, power consumption changes periodically in synchronization with driving of a power amplifier for generating a transmitting wave. Generally, as a power source for the TDMA-type portable cellular phone, a chemical cell using an electrochemical reaction or a direct current power source in which an upper limit value is imposed on its output current is used. Here, the periodical change in the power consumption represents that a load current flows in a burst period and in a non-burst period periodically and alternately.

In the case of using a chemical cell as a power source, when a load current flows during a burst period, a voltage of the chemical cell drops due to a voltage drop caused by an internal impedance in the chemical cell. However, when the load current flows during the non-burst period, an amount of the voltage drop decreases which causes a cell voltage to be restored. Such a periodic operation causes a cell voltage to be changed in a vibration manner. In a general device, if a voltage value during the burst period becomes less than a minimum driving voltage of a device, driving of the device is made impossible.

The chemical cell includes a primary cell such as a manganese dry cell, an alkaline dry cell, a lithium battery, or a like, and a secondary cell such as a lead storage battery, a Ni—Cd alkaline battery, a nickel-hydrogen cell, a lithium ion cell, or a like, and further a fuel cell or a like having a mechanism in which power is generated by causing chemical reaction of oxygen and hydrogen being fed from an outside.

In the case of a power source whose output current has an upper limit value, if a burst current value of a load current exceeds the upper limit value of a permissible current that the power source provides, an output is not generated by the power source and, as a result, a device cannot be driven. The power source whose output current has its upper limit value includes a direct current stabilizing power source having an output current limiting function such as a linear-regulator-type power source, switching-regulator-type power source, or a like, and a power source whose maximum current is limited due to current-carrying performance of an electrical wire which is required for carrying power since a direct-current power source including a chemical cell is located in a place being physically apart from the load.

According to the present invention, when a load is driven in which power consumption is periodically changed, in the case of using a chemical cell as a power source, it is made possible to lengthen operation time by improving discharging efficiency of a cell or, in the case of using a power source whose most upper output current is limited, even if power consumption of a device exceeds an upper limit value within a set period of time, driving of a device is made possible.

Also, according to the present invention, the above effect can be improved using a method in which setting of an upper limit value of a power current is changed.

Moreover, in the case of using a chemical cell as a power source, a primary cell or a secondary cell is used. In this case, by introducing a charging preventing device to prevent a primary cell from being erroneously charged, safety required for using the primary cell can be improved. Two types of units having functions of controlling a power source can be used in the power circuit of the present invention, one functioning singly as an output current limiting device and another functioning as both an output current limiting device and an output voltage limiting device, which has improved versatility so as to be able to meet different types or natures of a load current.

Furthermore, by introducing a capacitor discharging circuit adapted to discharge accumulated electric charges in the storage capacitor to remove residual electric charges existing after power is turned OFF.

BRIEF DESCRIPTION OF THE DRAWINGS

The above and other objects, advantages, and features of the present invention will be more apparent from the following description taken in conjunction with the accompanying drawings, wherein like reference characters refer to like parts throughout the specification and drawings, in which.

DETAILED DESCRIPTION OF THE PREFERRED EMBODIMENTS

Best modes of carrying out the present invention will be described in further detail using various embodiments with reference to the accompanying drawings.

First Basic Configuration

Figure 1:
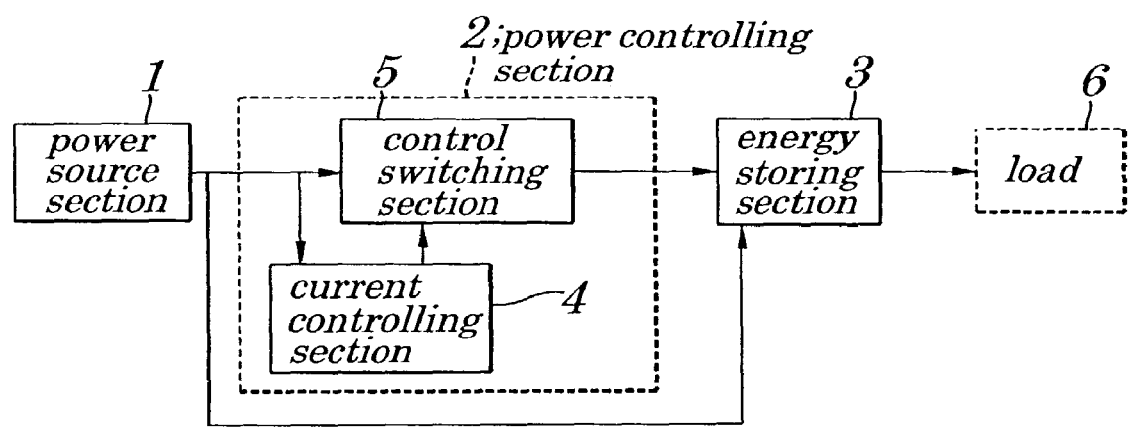
FIG. 1 is a diagram showing a first basic configuration of a power circuit according to the present invention.

A power circuit of the present invention has two basic configurations. FIG. 1 is a diagram showing a first basic configuration of a power circuit according to the present invention. The power circuit having the first configuration of the present invention, as shown in FIG. 1, chiefly includes a power source section 1, a power controlling section 2, and an energy storing section 3. The power controlling section 2 is made up of a current controlling circuit 4 and a control switching device 5. The power source section 1 is made up of a direct current power source. The power controlling section 2 is used to control a current output from the power source section 1 and includes a current controlling circuit 4 adapted to produce a control signal to be used for controlling a current output from the power source section 1 and a control switching device 5 adapted to control a current output from the power source section 1 according to a control signal fed from the current controlling circuit 4. The energy storing section 3 stores part of electric energy fed from the power source section 1, which is obtained after having undergone current control by the power controlling section 2 and supplies power to a load 6.

First Embodiment

Next, detailed configurations of the power circuit having the first basic configuration are further described.

Figure 2:
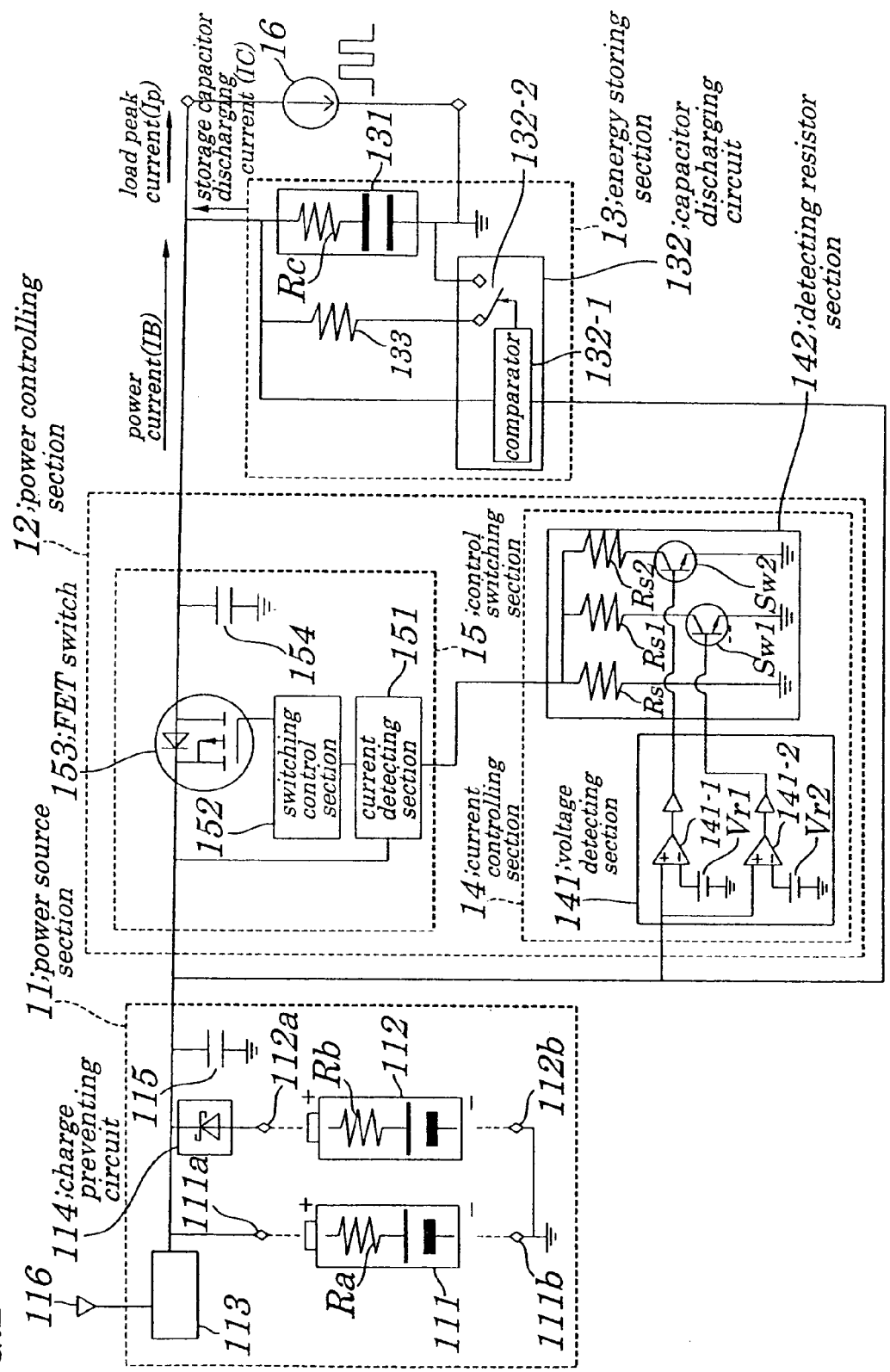
FIG. 2 is a circuit diagram for showing a concrete configuration of the power circuit according to a first embodiment of the present invention.
Figure 3:
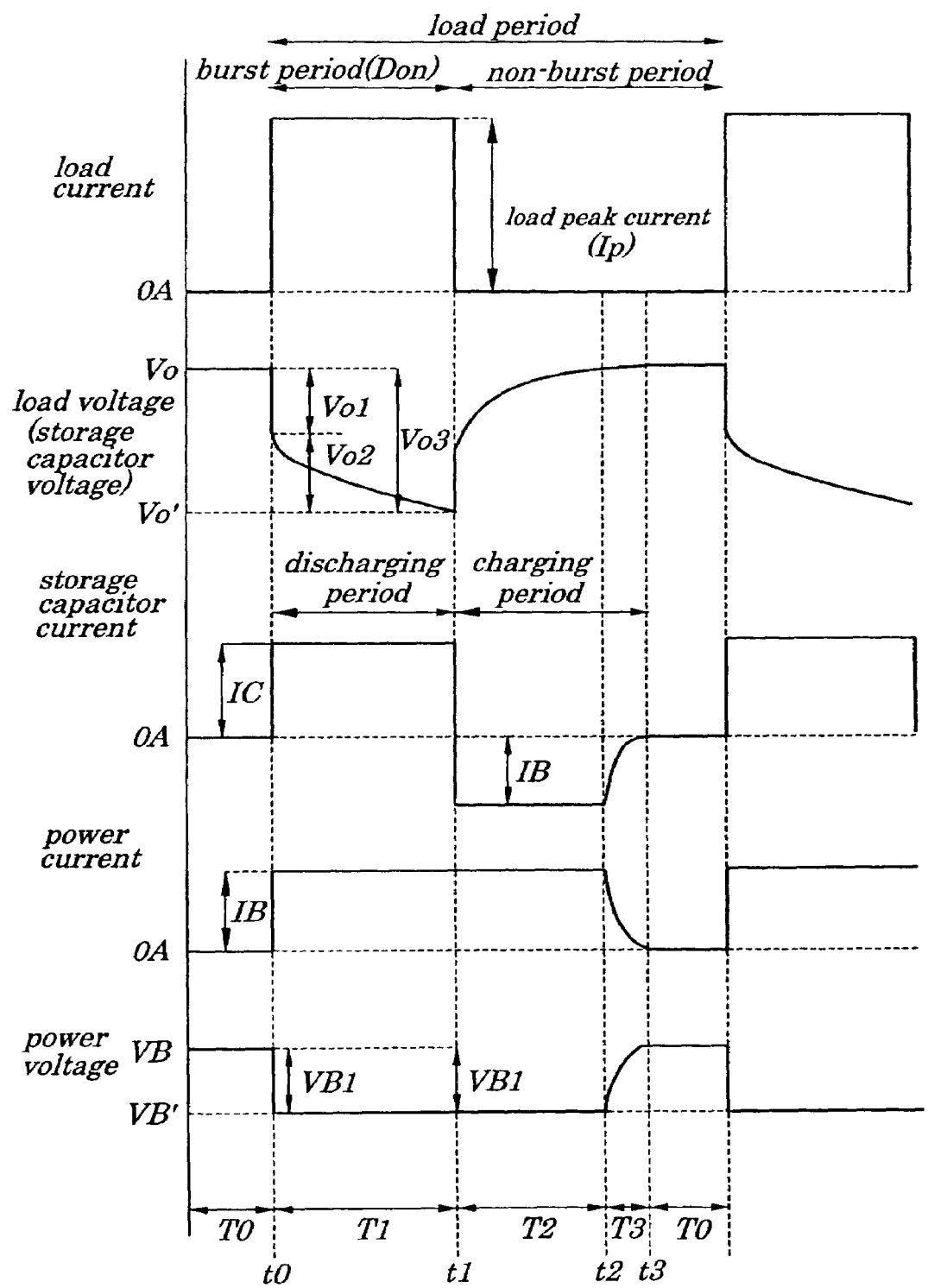
FIG. 3 is a time chart illustrating operations of the power circuit according to the first embodiment of the present invention.
Figure 4:
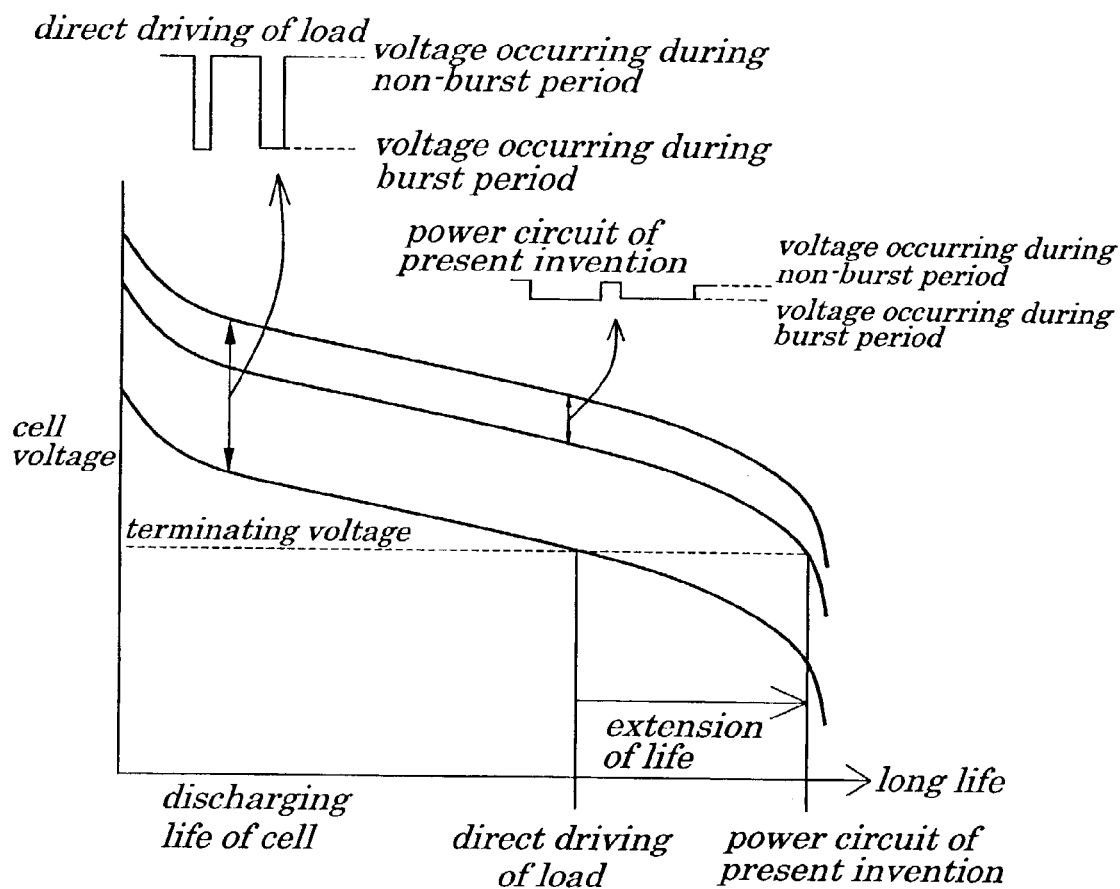
FIG. 4 is a diagram explaining an effect of an extension of a life of a cell in the power circuit according to the first embodiment of the present invention.

FIG. 2 is a circuit diagram for showing a concrete configuration of the power circuit of the first embodiment. FIG. 3 is a time chart illustrating operations of the power circuit of the first embodiment. FIG. 4 is a diagram explaining an effect of an extension of a life of a cell in the power circuit of the first embodiment.

The power circuit of the first embodiment, as shown in FIG. 2, chiefly includes a power source section 11, a power controlling section 12, and an energy storing section 13. The power controlling section 12 is made up of a current controlling section 14 and a control switching section 15.

The power source section 11 is a direct current power source using a chemical cell and makes up a cell holder that can house a secondary cell 111 or a primary cell 112. The power source section 11 further includes a secondary cell charging circuit 113, a charge preventing circuit 114, and a capacitor 115. A positive polarity terminal 111a being connected to a positive polarity of the secondary cell 111 is connected to an output side of the secondary cell charging circuit 113. A negative polarity terminal 111b being connected to a negative polarity of the secondary cell 111 is connected to a negative polarity side of the power source section 11. A positive polarity terminal 112a being connected to a positive polarity of the primary cell 112 is connected through a charge preventing circuit 114 to an output side of the secondary cell charging circuit 113. A negative polarity terminal 112b being connected to a negative polarity of the primary cell 112 is connected to a negative side of the power source section 11.

The secondary cell charging circuit 113 is connected between a charging power source 116 and the positive polarity terminal 111a of the secondary cell 11 and is configured so as to supply a charging current to the secondary cell 111. The charge preventing circuit 114 is made up of a voltage regulation diode and is connected between an output terminal of the secondary cell charging circuit 113 and a positive polarity terminal 112a of the primary cell 112 and is configured so as to prevent charging of the primary cell 112. The capacitor 115 is connected between an output side of the power source section 11, that is, between the output of the cell holder and a ground.

The power controlling section 12 is made up of the current controlling section 14 and the control switching section 15. The current controlling section 14 is made up of a voltage detecting section 141 and a detecting resistor section 142. The control switching section 15 includes a current detecting section 151, a switching control section 152, an FET (Field Effect Transistor) switch 153, and a capacitor 154.

In the current controlling section 14, the voltage detecting section 141 is provided with detectors 141-1 and 141-2 used to compare a voltage output from the power source section 11 with each of reference voltages Vr1 and Vr2 being different from each other. The detecting resistor section 142 has a resistor Rs one terminal of which is connected to a negative polarity, a resistor Rs1 one terminal of which is connected through a switch Sw1 to a negative polarity, and a resistor Rs2 one terminal of which is connected through a switch Sw2 to a negative polarity. One terminal of each of the resistors Rs, Rs1, and Rs2 is connected to a negative polarity and another terminal of each of the resistors Rs, Rs1, and Rs2 is connected to the current detecting section 151. In the control switching section 15, the current detecting section 151 receives power input from the power source section 11 and from the detecting resistor section 142 and outputs the power to the switching control section 152. A output terminal of the switching control section 152 is connected to a gate electrode of the FET switch 153. A source of the FET switch 153 is connected to an input terminal of source power and a drain of the FET switch 153 is connected to an output terminal of the source power. Between a drain of the FET switch 153 and a negative polarity is connected the capacitor 154.

The energy storing section 13 is made up of a storage capacitor 131, a capacitor discharging circuit 132, and a discharge resistor 133. The storage capacitor 131 is made up of an electric double layer capacitor having large capacity and including an internal resistor having a low resistance, to one terminal of which an output terminal of power controlling section 12 is connected and to another terminal of which a negative polarity is connected. A capacitor discharging circuit 132 has a comparator 132-1 used to compare a charging voltage of the storage capacitor 131 with an output voltage of the power source section 11 and a switch 132-2 operated to cause the storage capacitor 131 to short or not to short through a discharging resistor 133 according to a result from comparison in the comparator 132-1.

Next, operations of the power circuit of the embodiment are described by referring to FIG. 2. When the secondary cell 111 is to be connected to the power source section 11, the power source section 11 outputs a cell voltage of the secondary cell 111 having an internal resistor Ra. When a discharged amount in the secondary cell 111 decreases, the charging power source 116 placed in an outside charges the secondary cell 111 through the secondary cell charging circuit 113. The secondary cell charging circuit 113 controls a charging current fed from the charging power source 116 to the secondary cell 111. Moreover, to smooth changes in the source power caused by insertion and withdrawal of a cell or by its charging operations, the capacitor 115 and the secondary cell 111 are also connected, in parallel, between the output of the secondary cell charging circuit 113 and the ground. When the primary cell 112 is to be connected to the power source section 11, the power source section 11 outputs a cell voltage of the primary cell 112 having an internal resistor Rb. Even if operations of charging the primary cell 112 are started due to erroneous operations of the secondary cell charging circuit 113, since backflow of a current is prevented by the charge preventing circuit 114, there is no fear of being charged erroneously. Moreover, to smooth changes in the source power caused by insertion and withdrawal of the cell or by its charging operations, the primary cell 112 and the capacitor 115 are also connected, in parallel, between the output of the secondary cell charging circuit 113 and the ground. In the case of using a chemical cell, either of the secondary cell 111 or primary cell 112 is employed. Moreover, there is no case where both the secondary cell 111 and primary cell 112 are used simultaneously.

The load 16 provides a current pattern in which a burst period and a non-burst period occur alternately and periodically. In the first embodiment, a period of the current pattern is less than one second. In the embodiment, it is presumed that a load current being supplied during the burst period is larger than a current value that can be set in the current controlling section 14 and a load current being supplied during the non-burst period is 0A. However, even the load current is superimposed on a dc current, same effects obtained in the first embodiment can be achieved.

Operations of the power controlling section 12 and the energy storing section 13 being performed when the power source section 11 supplies the above-mentioned DC current to drive the load 16 will be described below. The power controlling section 12 controls a resistance of a resistor one terminal of which is connected to a negative polarity in the detecting resistor section 142 according to a result of detection of a voltage input from the power source section 11 in the voltage detecting section 141 of the current controlling section 14. Then, the control switching section 15 controls a period during which an output current flows by controlling the FET switch 153 being connected between an input terminal and an output terminal according to a control signal produced by detection of changes of an input power voltage by a voltage value occurring at another terminal of the resistor for detection. At this point, the capacitor 154 being connected between the output terminal and the negative polarity operates as a bypass capacitor to remove a component of an alternating current of an output current occurring through switching operations. The energy storing section 13 operates to make smaller a peak value of a current fed from the power source section 11 by causing the storage capacitor 131 having a large capacitor to store part of a load current during a burst period.

Next, operations of the power circuit of the embodiment are described by dividing a load period into periods including T0 to T3 by referring to a time chart shown in FIG. 3. Here, let it be assumed that the secondary cell 111 is used in the power source section 11 at an initial state and that each of circuit blocks of the power source section 11, the power controlling section 12, and the energy storing section 13 have been already driven.

During a period T0, when the load 16 is in a non-burst state, a current value of the power source section 11 (power current) is 0A and a voltage of the power source section 11 (power voltage) is VB. Since the load 16 is in a non-burst state, the load current is 0A and the load voltage (same voltage as storage capacitor voltage) is Vo. Moreover, there is no inputting and outputting of a current to and from the storage capacitor 131. At this point, the load voltage Vo is same as the power voltage VB.

At a time t0, when the load 16 is in a state where the burst period has begun, an upper limit value IB of a current flows which is set, as a power current, by control of the control switching section 15 in the power controlling section 12. The internal resistor Ra in the secondary cell 111 causes the power voltage VB to drop and an amount of the voltage drop becomes VB1. The amount of the voltage drop VB1 is approximately represented by a following equation:

$$VB1(V)=IB(A)\times Ra(\Omega) \quad (1)$$

Since the load current value is larger than the upper limit value IB, in order for a discharging current IC of the storage capacitor 131 to make up the shortage, the load voltage Vo is caused to drop by the internal resistor Rc and an amount of its voltage drop becomes Vo1. The amount of the voltage drop Vo1 can be approximately represented by a following equation:

$$Vo1(V)=IC(A)\times Rc(\Omega) \quad (2)$$

During a period T1, when the load 16 is in a burst period, a current of the upper limit value IB set, as a power current, by the current controlling section 14 flows continuously by control of the control switching section 15. Since a load period of the load 16 is less than one second, and a voltage drop caused by the capacity amount in the secondary cell 111 is very small, the voltage drop amount of the power voltage is almost equal to VB1. Since the load current is larger than IB, a shortage is discharged by the storage capacitor 131. Since a discharge current IC of the storage capacitor 131 flows continuously during the discharge period, a load voltage Vo contains a voltage drop Vo2 caused by discharge of the storage capacitor 131 in addition to a voltage drop Vo1 at time t1. Since a discharge current of the storage capacitor is constant at IC during the discharge period, the voltage drop Vo2 can be approximately represented, when an electrostatic capacity of the storage capacitor 131 is C, by a following equation:

$$Vo2(V)=IC(A)\times T1(\sec)/C(F) \quad (3)$$

Therefore, a final amount of the voltage drop Vo3 during this period can be approximately represented by a following equation:

$$Vo3(V)=Vo11(V)+Vo2(V) \quad (4)$$

At a final point in this period, the power voltage becomes VB' and the load voltage becomes Vo'.

At a time t1, when the load 16 is in a state where the burst period ends, since a state of no-load occurs, discharge of the storage capacitor 131 occurs and the load voltage Vo' starts to rise so that the power voltage VB' becomes equal to the load voltage Vo'. Since the storage capacitor 131 is in a state of low impedance, charging starts at an upper limit value IB set by the control switching section 15 in the power controlling section 12. Since a power current at this time remains IB being the same as in the period T1, the power voltage holds the same state as in the period T1.

During a period T2, since the load 16 is in a state of no-load, charging of the storage capacitor 131 occurs so that the power voltage VB' becomes equal to the load voltage Vo'.

Since the storage capacitor 131 remains in a low impedance state during this period, charging occurs in a continuous manner at an upper limit value IB of a current set by the control switching section 15 in the current controlling section 14. Since a power current at this time remains IB being the same as in the period T1, the power voltage holds the same state as in the period T1.

At time t2, since the load 16 is in a state where no load current occurs, charging of the storage capacitor 131 occurs so that the power voltage VB' becomes equal to the load voltage Vo'.

At this time, since a rise of the storage capacitor 131 causes the load voltage Vo' to increase, a difference between the power voltage VB' and the load voltage Vo' becomes small and therefore the charge current becomes smaller than the upper limit value IB set by the current controlling section 14. Since the power current IB at this time becomes smaller than IB, the power voltage starts to rise.

During a period T3, since the load 16 is in a state where no load current occurs, charging of the storage capacitor 131 occurs so that the power voltage VB' becomes equal to the load voltage Vo'.

In the charging of the storage capacitor 131 during this period, a difference between the power voltage VB' and the load voltage Vo' becomes smaller gradually and therefore the charging current gradually becomes smaller than the upper limit value IB of a current set by the current controlling section 14. During this period, a charging current to be finally fed to the storage capacitor 131 becomes zero and a state is restored where the power voltage VB' becomes equal to the load voltage Vo'.

At time t3, since the load 16 is in a state where no load current occurs and charging of the storage capacitor 131 is in a state where charging has been completed, the power current is 0A and the power voltage is VB. Moreover, the load current is 0A and the load voltage (same voltage as that of the storage capacitor 131) becomes Vo. There is no inputting or outputting of a current into and from the storage capacitor 131. At this time, the power voltage VB becomes equal to the load voltage Vo.

Then, the operation proceeds to a state occurring during the period T0. The same operations as were performed previously are repeated as below:

Operations during the period T0→Operations at the time t0→Operations during the period T1→Operations at the time t1→Operations during the period T2→Operations at the time t2→Operations during the period T3→Operations at the time t3→Operations during the period T0→ . . . .

With respect to a series of the above-mentioned operations, in the power circuit according to the first embodiment, respective circuit constants of the power controlling section 12 and the energy storing section 13 are set so that conditions described below can be satisfied.

First, let it be assumed that, when a circuit constant is to be set, a current pattern in which the burst period and the non-burst period occur alternately is employed and that, under a loading condition that a peak current Ip flowing during the burst period is larger than an upper limit value IB of the power current, a total time of a period T1 and a period T2 is equal to or shorter than one period "Tload" of this load. That is, $$T1(\text{Sec})+T2(\text{Sec})\leq T\text{load}(\text{Sec}) \quad (5)$$

Moreover, a circuit constant is set so as to satisfy a condition that the upper limit value IB of the power current is equal to or larger than a product of a peak current Ip when the load 16 is in a burst period and a duty ratio Don.

$$IB(A)\geq Ip(A)\times Don(\%)/100 \text{ (however, } IB<Ip) \quad (6)$$

When a voltage value being equivalent to Vo3 is to be obtained, a circuit constant is selected so that two constants including an internal resistor Rc and an electrostatic capacitor C satisfy a following equation:

$$Vo/2(V)\geq IC(A)\times\{Rc(\Omega)+(T\text{load}(\text{Sec})\times Don(\%))/(C(F)\times 100)\}=Vo3(V) \quad (7)$$

where "Vo" denotes a load voltage at time of no load, "Tload" denotes one period of a load, "IC" denotes a discharging current of the storage capacitor 131, "Don" denotes a duty ratio, and "IB" denotes an upper limit value of the power current. However, let it be also assumed that, in the case of a load upon which a direct current component is imposed, a calculation is performed by subtracting the direct current component.

The power circuit according to the first embodiment has a control function also in the following case. First, a control function in the case of the load 16 being a constant power load is described. When the load 16 is a constant power load, in the load 16, a current pattern is shown in which a flow of a load current repeats alternately one pattern occurring during the burst period and another pattern occurring during the non-burst period. In this example, the load period is less than one second. In addition to loading conditions described above, there is another condition in which, in the case of a load consuming a constant power, a change in a power voltage operates in synchronization with a change in a load current including such a case where, the lower the source power becomes, the larger the load current becomes.

In the case of such the constant power load, by changing a value set for limiting the power current according to a power voltage, the above effect of the configuration according to the first embodiment can be maintained.

In the current controlling section 14, a power voltage is monitored by the voltage detecting section 141. When the power voltage reaches a predetermined value, the voltage detecting section 141 causes a control voltage to occur in the detecting resistor section 142 which changes automatically a threshold value for detecting a current. Even if a power circuit is driven according to such operations as described above, an upper limit value IB of the current set by the current controlling section 14 can be automatically changed and therefore the power circuit can be applied to a load having constant power.

Next, in the power circuit according to the first embodiment, a control function to be performed when the power source section 11 is shorted during operation will be described. Since, during operations of the power circuit, a storage capacitor 131 in the energy storing section 13 is in a state of charging and has its accumulated charge, if the power source section 11 is shorted, backflow of a current caused by discharging of the storage capacitor 131 occurs which produces a risk of destroying the power controlling section 12.

To avoid such a risk, while the power circuit is being driven, a power voltage of the power source section 11 and a charging voltage of the storage capacitor 131 are monitored by the capacitor discharging circuit 132 at all the time. The comparator 132-1 of the capacitor discharging circuit 132, when detecting a state in which a charging voltage of the storage capacitor 131 becomes higher than a power voltage of the power source section 12, turns ON the switch 132-2 and therefore the storage capacitor 131 discharges at a limited current value through a discharging resistor 133 which prevents electric charges of the storage capacitor 131 from flowing back to the power source section 11 through the power controlling section 12 and, as a result, a breakage of the power controlling section 12 can be prevented.

Thus, according to the power circuit and the method for controlling the power circuit according to the first embodiment, in the power circuit having a direct current power source as a power source, since an energy storing section is placed on an output side of the power controlling section adapted to perform a control to limit an output current and a control of an output voltage in order to absorb a change in a load current, even in the case of a pulse load whose load current changes repeatedly between in the burst period and in the non-burst period, a peak current value of a power current can be made smaller.

By making smaller a peak value of a power current, when a cell is used as a power source, its discharging life can be extended. FIG. 4 is a diagram explaining an effect of an extension of a discharging life of a cell in the power circuit according to the first embodiment of the present invention. In the case of the power circuit of the embodiment, since a peak current value of a power current becomes smaller, discharging characteristics change when compared with direct driving of a load by using the cell and, therefore, in the case of a same terminating voltage, a discharging life can be clearly extended longer when compared with a life provided by direct driving of the load by using the cell.

Moreover, even in the case of a power source whose output current has its upper limit value, though power consumption of a load exceeds an upper limit value only during the burst period, if an amount of its average power consumption is less than an amount of supply power, the power circuit can be driven. Furthermore, in the case where a load consumes a constant amount of power and it provides a current pattern in which it flows in a burst period and a non-burst period alternately and periodically, since an upper limit value of a set current can be automatically changed according to a power voltage, even if a load is a constant power or a periodical pulse, the above effect of the configuration according to the first embodiment can be maintained.

Second Basic Configuration

Figure 5:
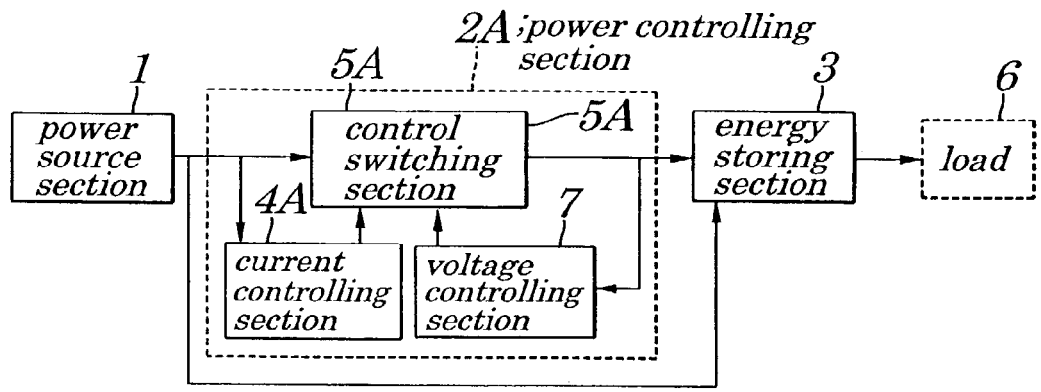
FIG. 5 is a diagram showing a second basic configuration of a power circuit according to the present invention.

Next, a second basic configuration of the present invention is described. The power circuit having the second basic configuration according to the present invention, as shown in FIG. 5, chiefly includes a power source section 1, a power controlling section 2A, and an energy storing section 3. Of them, configurations of the power source section 1 and the energy storing section 3 are same as those employed in the power circuit having the first basic configuration shown in FIG. 1. The power controlling section 2A produces a control signal used to control a current and a voltage output from the power source section 1. The power controlling section 2A is made up of a current controlling circuit 4A adapted to produce a control signal to control a current output from the power source section 1, a voltage controlling section 7 adapted to produce a control signal to control a voltage output from the power source section 1, and a control switching device 5A adapted to control a current and a voltage output from the power source section 1 according to a control signal fed from the current controlling circuit 4A and the voltage controlling section 7.

Next, detailed configurations of an embodiment of the power circuit having the second basic configuration are described.

Second Embodiment

Figure 6:
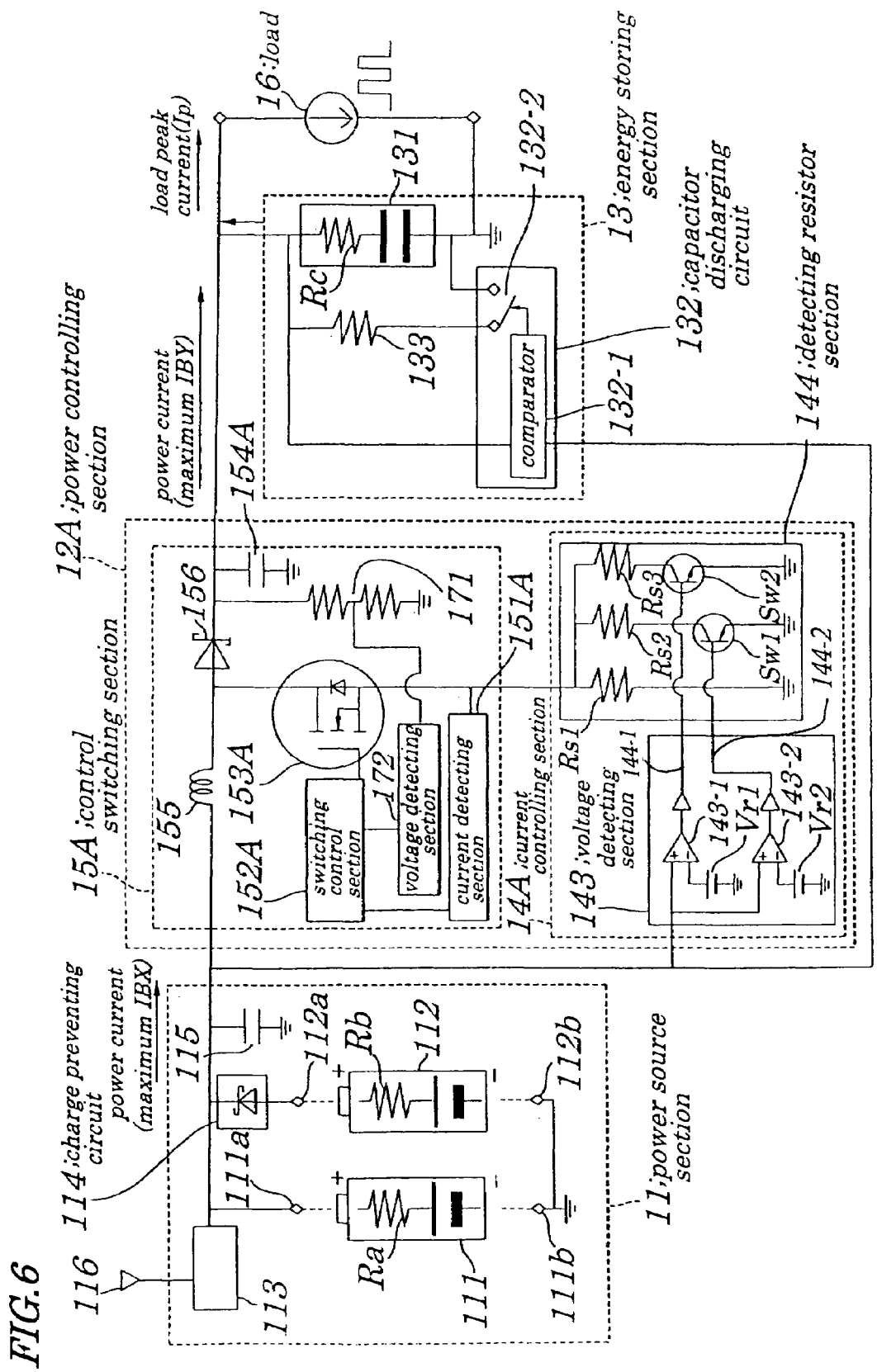
FIG. 6 is a circuit diagram for showing a concrete configuration of a power circuit according to a second embodiment of the present invention.

FIG. 6 is a circuit diagram showing a concrete configuration of a power circuit according to a second embodiment of the present invention.

The power circuit of the embodiment, as shown in FIG. 6, chiefly includes a power source section 11, a power controlling section 12A, and an energy storing section 13. Of them, configurations of the power source section 1and the energy storing section 3 are same as those employed in the power circuit having the first basic configuration shown in FIG. 2.

The power controlling section 12A is made up of a current controlling section 14A adapted to produce a control signal to control a current output from the power source section 11 and a control switching section 15A adapted to control a current according to a control signal fed from the current controlling section 14A and to control a voltage output to the load 16. The current controlling section 14A is made up of a voltage detecting circuit 143 having a plurality of detectors 143-1 and 143-2 used to compare a voltage output from the power source section 11 with a plurality of reference voltages Vr1 and Vr2 being different from each other and a detecting resistor section 144 having a plurality of resistors Rs1, Rs2, and Rs3 used to set a plurality of currents and having switches Sw1 and Sw2 used to connect resistors Rs1, Rs2, and Rs3 in parallel according to an output from detectors 143-1 and 143-2.

The control switching section 15A has a switching-type step-up DC—DC converter circuit made up of an FET switch 153A, a capacitor 154A, a coil 155, and a diode 156, a voltage detecting circuit 151A adapted to detect a voltage produced by a detecting resistor section 144 in the current controlling section 14A, a voltage detecting circuit 172 adapted to detect a voltage at an output terminal through an output voltage set resistor 171, and a switching control section 152A adapted to input a control signal to turn ON and OFF an FET switch 153A by a detecting signal of the current detecting section 151A and a detecting signal of the voltage detecting circuit 172 into a gate of the FET switch 153A.

Next, operations of the power circuit of the embodiment are described by referring to FIG. 6. In this case, operations of the power source section 11 and the load 16 are same as those shown in FIG. 2. Operations of the power controlling section 12A and the energy storing section 13 are described which are performed when the power source section 11 supplies direct current source power which flows through the power controlling section 12A to drive the load 16. Moreover, at this point, an operation time chart of the power circuit is almost the same as that shown in FIG. 3.

The power controlling section 12A performs operations of a switching-type step-up DC—DC converter having a current controlling circuit. The energy storing section 13 is connected to an output side of the step-up DC—DC converter. The energy storing section 13, discharges accumulated charges of the storage capacitor 131 when the load 16 is in a burst period, and discharges accumulated charges of the storage capacitor 131 to drive the load 16. The power circuit according to the second embodiment is provided with the step-up DC—DC converter, and accordingly differs from those of the first embodiment in that a load voltages, occurring when there is no load current, is higher than the power voltage.

Moreover, in operations of the step-up DC—DC converter, as an upper limit value of a power current, there exist two amounts of currents, one amount of a current flowing out of the power source section 11 and another amount of a current flowing out of the power controlling section 12A. The amount of the current flowing out of the power source section 11 is numerically different from that flowing out of the power controlling section 12A. Now, if the amount of the current flowing out of the power source section 11 is IBX and the amount of the current flowing out of the power controlling section 12A is IBY, an expression of IBX>IBY can be obtained.

In the time chart shown in FIG. 3, since a voltage drop occurred due to an internal resistor Ra in the secondary cell 111 is caused by an amount of a current IBX flowing from the power source section 11, an amount of the voltage drop VB1 is represented by a following equation:

$$VB1(V) = IBX(A) \times Ra(\Omega) \quad (8)$$

On the other hand, since a current IB to determine a circuit constant of the power circuit of the embodiment is an amount of a current IBY flowing out of the power controlling section 12A, a following equation is formed.

$$IBY(A) \geq Ip(A) \times Don(\%)/100 \quad (9)$$

However, in the above equation, IBY<Ip.

Since the step-up DC—DC converter is so configured that a load voltage becomes stable, a source current increases as a source voltage drops and, therefore, from the viewpoint of the power source section 11, the load 16 is regarded as a load consuming a constant power. Thus, the effect of configuration according to the second embodiment can be maintained that, in the case of such the constant power load, by changing a set value for a limit on the source current depending on the power voltage, even if a power voltage changes, in the case of the pulse load whose load current changes repeatedly between in the burst period and in the non-burst period, a discharging life is made longer by making smaller a peak current value of the source current.

In the current controlling section 14A, a power voltage is monitored by the voltage detecting circuit 143 and, when the power voltage reaches a predetermined value, a control signal (e.g., 144-1 and/or 144-2) is output from the voltage detecting circuit 143 to the detecting resistor section 144 and, based on the control signal, the detecting resistor section 144 operates to change a value of a resistor for detection, which automatically changes a threshold value for detection of a current in the current detecting section 151A. Since such operations enable an automatic change of an upper limit value of a current set by the current controlling section 14A, even when the step-up DC—DC converter having the configuration described above is employed, the same effect as achieved in the first embodiment. In this case, conditional equations (5) and (7) described above can be applied as in the case of the first embodiment.

In the power circuit of the embodiment, if the power source section 11 is shorted during operations, since the storage capacitor 131 in the energy storing section 13 is in a state of charging and has accumulated electric charges, shorting in the power source section 11 causes backflow of a current due to discharging of the storage capacitor 131, which produces a risk of destroying the power controlling section 12A. In order to avoid such risks as described above, while the power circuit is being operated, a power voltage of the power source section 11 and a charging voltage of the storage capacitor 131 are monitored by the capacitor discharging circuit 132 at all the time. Since the comparator 132-1, when having detected a state in which a charging voltage of the storage capacitor 131 is in a predetermined relation with the power voltage of the power source section 11, performs an operation to turn ON the switch 132-2 of the capacitor discharging circuit 132, such the flowback of the current can be avoided by causing the storage capacitor 131 to discharge by using a current limited by the discharging resistor 133.

Thus, in the power circuit according to the second embodiment, since the power controlling section 12A is provided with a current limiting function of changing automatically an upper limit value of an output current, even in the case where the step-up DC—DC converter performs switching-type operations, same effects as in the first embodiment can be obtained.

Third Embodiment

Next, configurations of the power circuit based on the second basic configurations of the present invention will be described in detail.

Figure 7:
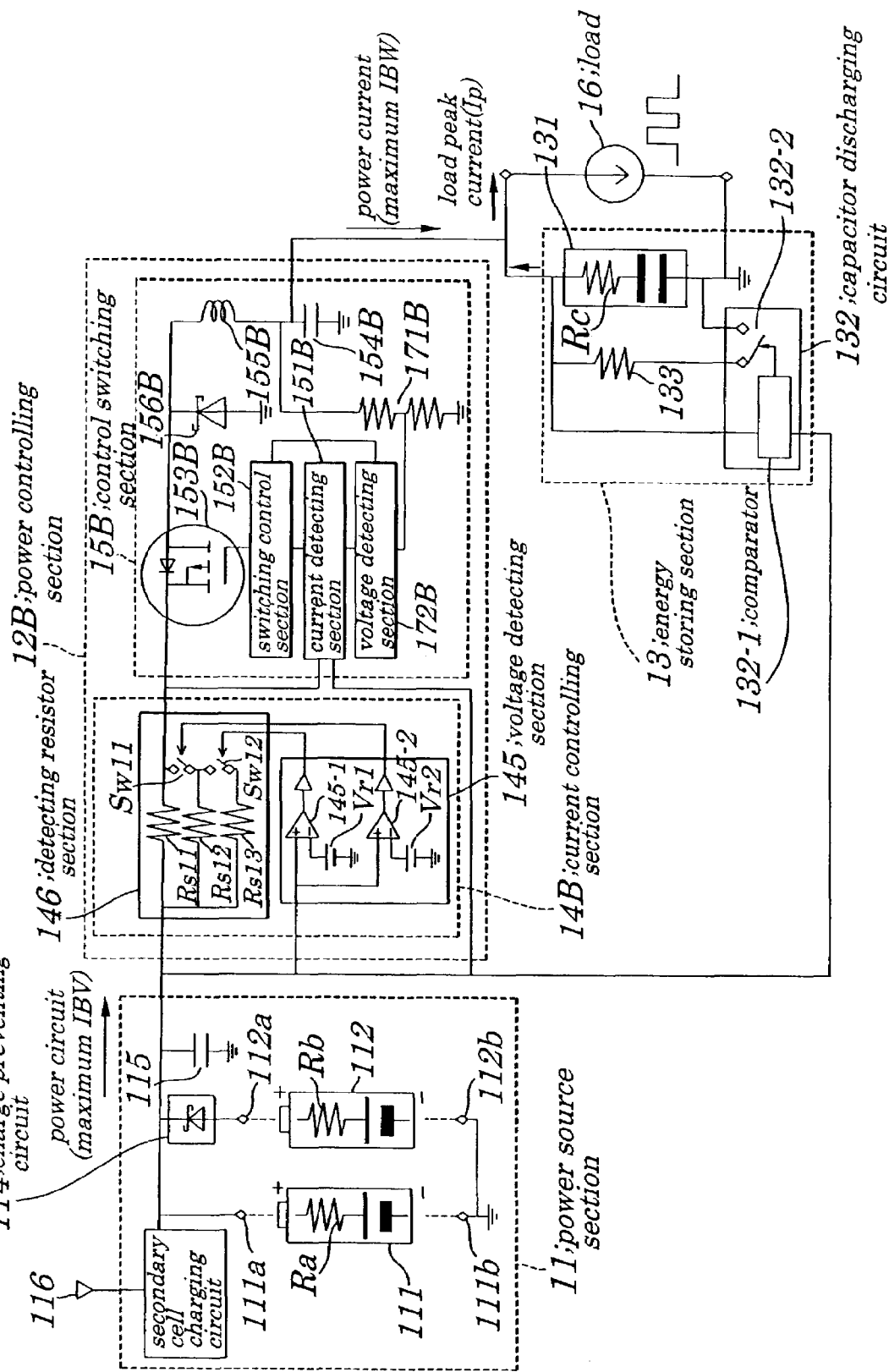
FIG. 7 is a circuit diagram for showing a concrete configuration of a power circuit according to a third embodiment of the present invention.

A power circuit according to a third embodiment of the present invention, as shown in FIG. 7, chiefly includes a power source section 11, a power controlling section 12B, and an energy storing section 13. Of them, configurations of the power source section 11 and the energy storing section 13 are the same as in the case of the first embodiment as shown in FIG. 2.

The power controlling section 12B is made up of a current controlling section 14B adapted to produce a control signal to control a current output from the power source section 11 and a control switch section 15B adapted to control a current according to a control signal fed from the current controlling section 14B and to control a voltage output to the load 16.

The current controlling section 14B is made up of a voltage detecting circuit 145 having a plurality of detectors 145-1 and 145-2 used to compare a voltage output from the power source section 11 with a plurality of reference voltages Vr1 and Vr2 being different from each other and a detecting resistor section 146 being provided with a plurality of resistors Rs11, Rs12, and Rs13 used to perform a plural setting of currents and switches Sw11 and Sw12 being operated according to an output from the detectors 145-1 and 145-2 to connect resistors Rs11, Rs12, and Rs13 in parallel.

The control switch section 15B has a switching-type step-down DC—DC converter circuit made up of an FET switch 153B, a capacitor 154B, a coil 155B, and a diode 156B and also includes a current detecting section 151B adapted to detect a voltage produced by the detecting resistor section 146 in the current controlling section 14B, a voltage detecting circuit 172B adapted to detect a voltage occurring at an output terminal through an output voltage setting resistor 171B and a switching control section 152B adapted to input a control signal used to perform ON/OFF control of the FET switch 153B according to a signal detected by the current detecting section 151B and a signal detected by the voltage detecting circuit 172B into a gate of the FET switch 153B.

Next, operations of the power circuit of the embodiment are described by referring to FIG. 7. In this case, operations of the power source section 11 and the load 16 are the same as in the case of the second embodiment shown in FIG. 6. Operations of the power controlling section 12B and the energy storing section 13 are described below which are performed when the power source section 11 supplies direct current source power which flows through the power controlling section 12B to drive the load 16. Moreover, an operating time chart of the power circuit used in the embodiment is almost the same as shown in FIG. 3.

The power controlling section 12B performs switching operations of the step-down DC—DC converter having a current limitation function. The energy storing section 13 is connected to an output side of the step-down DC—DC converter, discharges accumulated charges of the storage capacitor 131 when the load 16 is in a burst period and drives the load 16.

The power circuit of the embodiment differs from that employed in the first embodiment in that, since it has the step-down DC—DC converter, a load voltage occurring at time of no-load is lower than a power voltage.

Moreover, in the operations of the step-down DC—DC converter, as an upper limit value of the power current, there are two kinds of amounts of currents, one flowing out of the source power section 11 and another flowing out of the power controlling section 12B. Such the amount of the current flowing out of the power source section 11 differs from that of the current flowing out of the power controlling section 12B. Now, if it is presumed that an amount of a current flowing out of the power source section 11 is IBV and an amount of a current flowing out of the power controlling section 12B is IBW, a relation that IBV<IBW is formed.

At a time t0 in the time chart shown in FIG. 3, since a voltage drop caused by an internal resistor Ra of the secondary cell 111 is equal to a voltage drop caused by the amount of the current IBV flowing out of the power source section 11, the amount of the voltage drop VB1 is approximately represented by a following equation:

$$VB1(V)=IBV(A) \times Ra(\Omega) \tag{10}$$

On the other hand, an amount of a current IB used to determine a circuit constant of the power circuit of the embodiment is an amount of the current IBW flowing out from the power controlling section 12B, a following relation is formed.

$$IBW(A) \geq Ip(A) \times Don(\%)/100 \text{ (however, } IBW<Ip) \tag{11}$$

Since the step-down DC—DC converter is so configured that a load voltage becomes constant and, as a power voltage drops, a power current increases and, therefore, from the viewpoint of the power source section 11, the load 16 is regarded as a load consuming a constant power.

Thus, the effect of configuration according to the third embodiment can be also maintained that, in the case of such the constant power load, by changing a set value for a limit on the source current depending on the power voltage, even if power voltage changes, in the case of the pulse load whose load current changes repeatedly between in the burst period and in the non-burst period, a discharging life is made longer by making smaller a peak current value of the source current.

In the current controlling section 14B, a power voltage is monitored by the voltage detecting circuit 144 and, when the power voltage reaches a predetermined value, a control signal is output from the voltage detecting circuit 145 to the detecting resistor section 146 and, based on the control signal, a threshold value for detection of a current in the detecting resistor section 146 is automatically changed. By such the operations as described above, an upper limit value of the current set by the current controlling section 14B can be automatically changed and, therefore, by employing the configurations of the step-down DC—DC converter, the same effects as obtained in the first embodiment can be achieved. In this case, conditional equations (5) and (7) described above can be applied as in the case of the first embodiment.

In the power circuit of the embodiment, if the power source section 11 is shorted during its operations, since the storage capacitor 131 in the energy storing section 13 is in a state of charging and has accumulated charges, the shorting in the power source section 11 causes backflow of a current due to discharging of the storage capacitor 131 which produces a risk of destroying the power controlling section 12B. To avoid such the risk, while the power circuit is being driven, a power voltage of the power source section 11 and a charging voltage of the storage capacitor 131 are monitored by the capacitor discharging circuit 132 at all the time. The comparator 132-1, when detecting a state in which a charging voltage of the storage capacitor 131 is in a predetermined relation with a power voltage of the power source section 11, turns ON a switch 132-2 in the capacitor discharging circuit 132 and, therefore, by discharging electric charges of the storage capacitor 131 using a current limited by a discharging resistor 133, it is possible to avoid a risk of such the backflow.

Thus, in the power circuit of the embodiment, since the power controlling section 12B has a current limiting function of automatically changing an upper limit value of an output current, even in the case of performing the operations of the switching-type step-down DC—DC converter, the same effects as in the case of the first embodiment can be achieved.

Fourth Embodiment

Next, configurations of the power circuit having a power source section being different from those in the case of the second and third embodiments of the present invention. Moreover, in this case, since configurations of a power controlling section and an energy storing section can be either of those employed in the above embodiments, descriptions of them are omitted.

Figure 8:
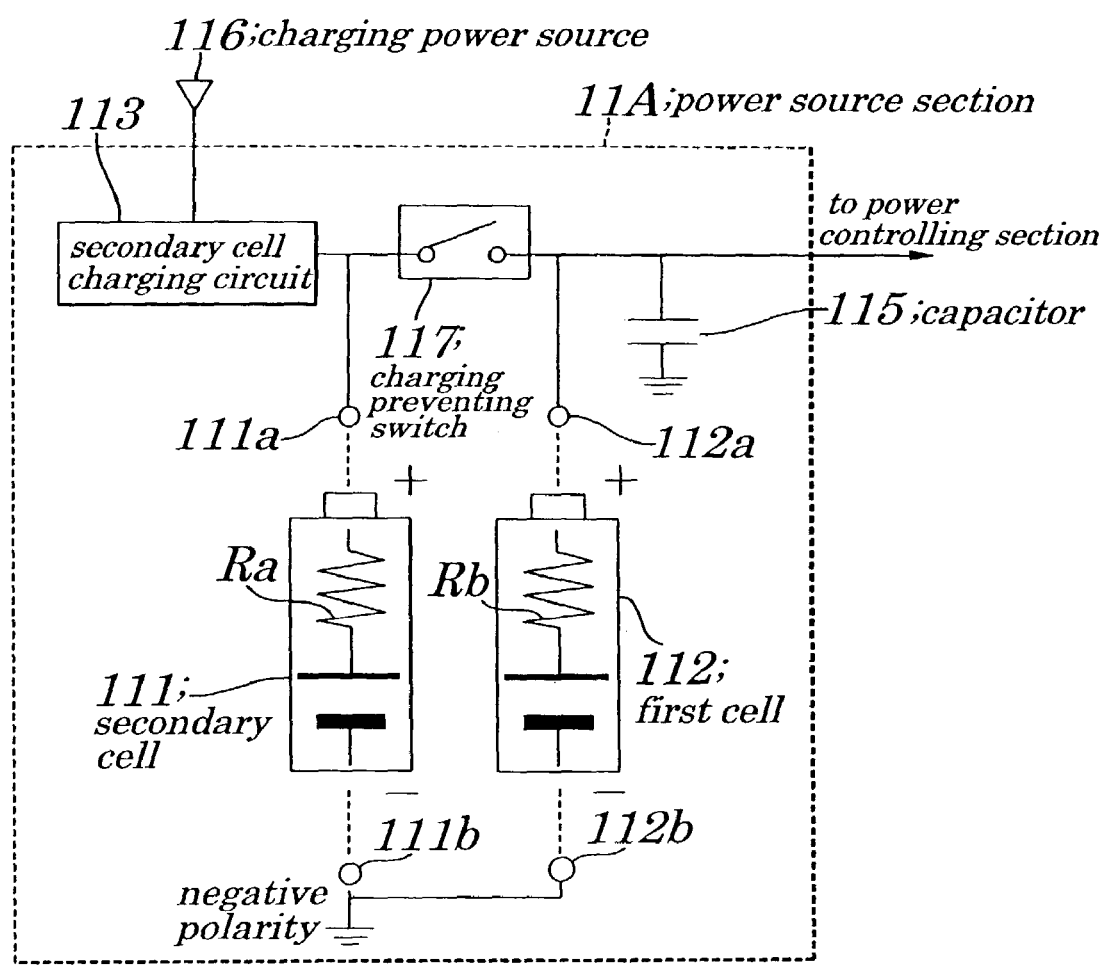
FIG. 8 is a circuit diagram for showing a concrete configuration of a power source section in a power circuit according to a fourth embodiment of the present invention.

FIG. 8 is a circuit diagram showing configurations of a power source section in the power circuit according to a fourth embodiment of the present invention. A power source section 11A in the power circuit of the embodiment is a direct current source power using a chemical cell and makes up a cell holder that can house a secondary cell 111 or a primary cell 112. The power source section 11A includes a secondary cell charging circuit 113, a capacitor 115, and a charging preventing switch 117.

The secondary cell 111 has an internal resistor Ra. An output terminal of the secondary cell charging circuit 113 is connected to a positive polarity terminal 111a being connected to a positive polarity of the secondary cell 111. A negative polarity terminal 111b being connected to a negative polarity of the secondary cell 111 is connected to a negative polarity side of the power source section 11A. The primary cell 112 has an internal resistor Rb. A positive polarity terminal 112a being connected to a positive polarity of the primary cell 112 is connected through a charging preventing switch 117 to an output side of the secondary cell charging circuit 113. A negative polarity terminal 112b being connected to a negative polarity of the primary cell 112 is connected to a negative side of the power source section 11A.

The secondary cell charging circuit 113 is connected between a charging power source 116 and a positive polarity terminal 111a of the secondary cell 111 and, when a voltage of the secondary cell 111 drops, a charging current is fed from the charging power source 116 to the secondary cell 111. The capacitor 115 is connected to an output side of the power source section 11A, that is, between an output terminal of the cell holder and a ground, which performs to smooth a change in the power voltage at time of insertion and withdrawal of a cell or at time of charging. The charging preventing switch 117, when the primary cell 112 is inserted into the cell holder, is mechanically turned OFF. The power source section 11A, when being connected to the primary cell 112, outputs a cell voltage of the primary cell 112 to a side of the power controlling section. The charging preventing switch 117, when the primary cell 112 is inserted into the cell holder, is turned OFF to disconnect the primary cell 112 from the secondary cell charging circuit 113 and therefore there is no fear that the primary cell 112 is charged.

Thus, in the power source section in the power circuit according to the fourth embodiment of the prevent invention, when only the secondary cell 111 is used, while the secondary cell charging circuit 113 is charging the secondary cell 111, an output of the secondary cell can be fed to the power controlling section and, when only the primary cell 112 is used, while the charging preventing switch 117 operates to prevent the primary cell 112 from being charged, an output of the primary cell 112 can be fed to the power controlling section.

Fifth Embodiment

Figure 9:
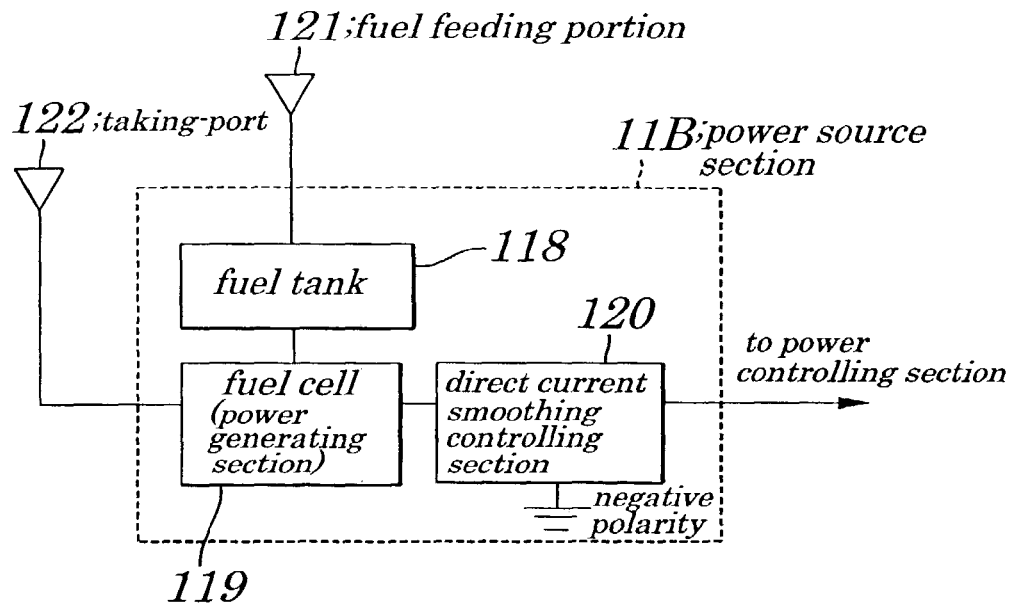
FIG. 9 is a circuit diagram for showing a concrete configuration of a power source section in a power circuit according to a fifth embodiment of the present invention.

FIG. 9 is a circuit diagram showing configurations of a power source section in a power circuit according to a fifth embodiment of the present invention. The power source section 11B in the power circuit of the embodiment includes, as shown in FIG. 9, a fuel tank 118, a fuel cell 119, and a direct current smoothing controlling section 120. The power source section 11B is a direct current power source using a fuel cell which stores fuel made of hydrogen or methanol fed from a fuel feeding portion 121 in a fuel tank 118 and the fuel cell 119 serving as a power generating section generates power by using a chemical reaction obtained by mixing fuel fed from the fuel tank 118 with oxygen or air fed from a taking-port 122 and feeds the generated power through a direct current smoothing controlling section 120 adapted to stabilize source power to the power controlling section.

Thus, according to the power source section in the power circuit of the embodiment, the power circuit can be achieved that can generate direct current source power by being provided with the fuel cell system using fuel made of hydrogen, methanol, or a like and oxygen or air to produce a chemical reaction.

Sixth Embodiment

Figure 10:
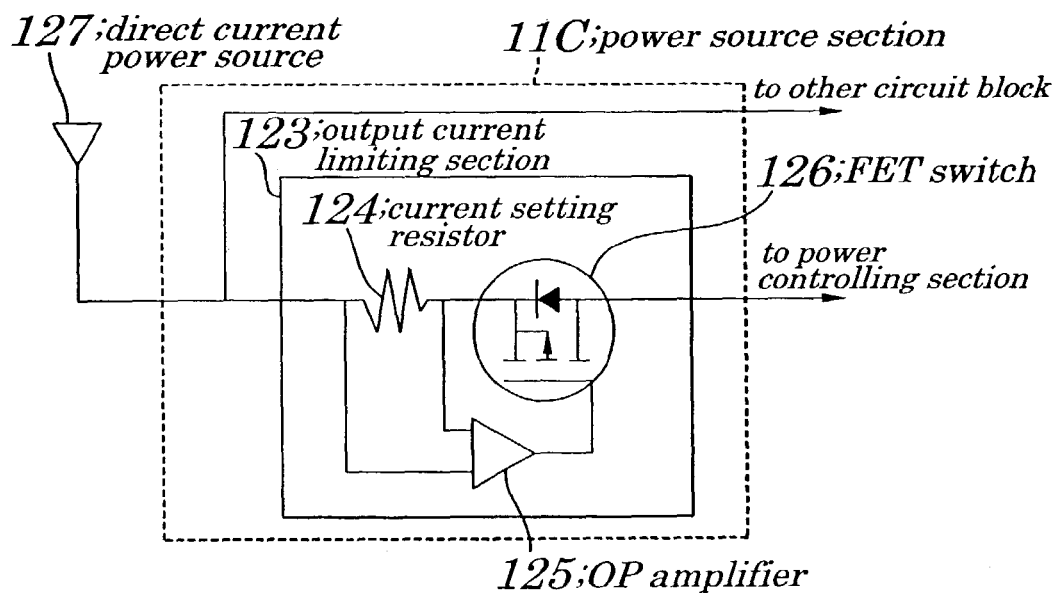
FIG. 10 is a circuit diagram for showing a concrete configuration of a power source section in a power circuit according to a sixth embodiment of the present invention.

FIG. 10 is a circuit diagram showing configurations of a power source section in a power circuit according to a sixth embodiment of the present invention. The power source section 11C making up the power circuit of the embodiment is provided with an output current limiting section 123 is so configured as to receive a current from a direct current power source 127 and to impose limitation on an upper limit value of a current output to a power controlling section. The output current limiting section 123 includes a current setting resistor 124, an operational amplifier (OP amplifier) 125, and an FET switch 126. In the output current limiting section 123, the operational amplifier 125 amplifies a voltage across a current setting resistor 124 based on a current input from the direct current power source 127, and feeds the amplified voltage as a control signal to a gate of the FET switch 126 so as to control a current fed from the direct current power source 127. Thus, the output current limiting section 123 imposes limitation on a current fed from the direct current power source 127 so that the current is kept within a predetermined upper limit and outputs the limited current to the power controlling section.

Thus, since the power source in the power circuit of the embodiment, by having the output current limiting section, can obtain a current limited within a predetermined upper limit value from the direct current power source.

It is apparent that the present invention is not limited to the above embodiments but may be changed and modified without departing from the scope and spirit of the invention. For example, the power circuit of the present invention can be applied not only to a portable cellular phone but also to any kind of portable devices in which a load current flows periodically and alternately in a burst-period and a non-burst period. Moreover, in this case, it is not always necessary that a current flowing in the non-burst period is 0 A.

What is claimed is:

1. A power circuit for feeding a load current to a load in which said load current repeats periodically and alternates a burst flow in a burst period and a non-burst flow in a non-burst period comprising:
    a power source section made up of a direct current power source having one terminal connected to a negative polarity;
    a source power controlling section to control a current fed from a second terminal of said power source section connected to an input terminal to limit voltage drop in said power source section and to feed said current to a load connected to an output terminal; and
    an energy storing section having a storage capacitor connected between said output terminal and a negative polarity;
    wherein said source power controlling section is provided with a current controlling circuit to control a resistance value of a detecting resistor section, said detecting resistor section having one terminal connected to said negative polarity, according to a result of detection of a voltage input from said power source section, and a switching circuit which has a circuit part comprising a switching device connected between an input terminal and an output terminal of said source power controlling section and a capacitor connected between said output terminal of said source power controlling section and a negative polarity, and which controls a flowing period of an output current by exerting control on said switching device according to a control signal produced by detecting a change in an input power voltage using a voltage value occurring at another terminal of said detecting resistor; and
    wherein a circuit constant of said source power controlling section, electrostatic capacity and internal resistance of said storage capacitor are determined by following equations:

$T1+T2 \leq T\text{load}$ where "T1+T2" denotes a flowing period (Sec) of a power current and "Tload" denotes a load period (Sec):

$Vo/2 \geq IC \times \{Rc+(T\text{load} \times D\text{on})/(C \times 100)\} = Vo3$ where "Vo" denotes a voltage (V) of said storage capacitor when there is no load current, "IC" denotes a current (A) of said storage capacitor, "Rc" denotes an internal resistance ($\Omega$) of said storage capacitor, "Don" denotes a duty ratio (%) of a load, "C" denotes a capacity (F) of a storage capacitor, and "Vo3" denotes an amount of a voltage drop (V) of a storage capacitor voltage occurring during a burst period.

2. The power circuit according to claim 1, wherein said power source section comprises a secondary cell connected between an output terminal and said negative polarity and connected to a charging power source through a charging circuit, and a primary cell being connected to said negative polarity and to said output terminal through a charging preventing circuit used to prevent charging from said charging power source.

3. The power circuit according to claim 1, wherein said power source section comprises a secondary cell connected between an output of a charging circuit and said negative polarity and connected to an output terminal through a charging preventing switch, and a primary cell being connected between said output terminal and said negative polarity.

4. The power circuit according to claim 1, wherein said power source section comprises a fuel tank, a fuel cell to generate power using fuel fed from said fuel tank, and a direct current smoothing controlling section to stabilize a voltage output from said fuel cell and to feed it to an output terminal.

5. The power circuit according to claim 1, wherein said power source section comprises a current setting resistor to set a value of an output current, an operational amplifier to amplify a detected voltage of said current setting resistor, and a switching circuit to control a power current according to an output of said operational amplifier.

6. The power circuit according to claim 1, wherein a storage capacitor in said energy storing section comprises an electric double layer capacitor.

7. The power circuit according to claim 6, wherein said storage capacitor has a capacitor discharging circuit used to cause a charge of said storage capacitor to be shorted through a discharging resistor when a predetermined relationship, determined by comparing a terminal voltage of said storage capacitor with a power voltage, exists.

8. A power circuit for feeding a load current to a load in which said load current repeats periodically and alternately a burst flow in a burst period and a non-burst flow in a non-burst period comprising:
    a power source section made up of a direct current power source having one terminal connected to a negative polarity;
    a source power controlling section to control a current fed from a second terminal of said power source section being connected to an input terminal to limit voltage drop in said power source section and to feed said current to a load connected to an output terminal; and
    an energy storing section having a storage capacitor connected between said output terminal and a negative polarity;
    wherein said source power controlling section is provided with a current controlling circuit to control a resistance value of a detecting resistor section, said detecting resistor section having one terminal connected to said negative polarity, according to a result of detection of a voltage input from said power source section, and a switching circuit which has a step-up DC—DC (direct current to direct current) converter circuit comprising a voltage detecting circuit to detect a voltage of an output terminal, a coil and diode connected in series between an input terminal and an output terminal of said source power controlling section, a capacitor connected between said output terminal of said source power controlling section and a negative polarity, and a switching device connected between a connection point of said coil and said diode and another terminal of said detecting resistor section, and which controls a flowing period of an output current by exerting control on said switching device according to a control signal produced by detecting a change in a current through said switching device using a voltage value at said other terminal of said detecting resistor section and a voltage at said output terminal; and
    wherein a circuit constant of said source power controlling section, electrostatic capacity and internal resistance of said storage capacitor are determined by following equations:

$T1+T2 \leq T\text{load}$ where "T1+T2" denotes a flowing period (Sec) of a power current and "Tload" denotes a load period (Sec):

$$Vo/2 \geq IC \times \{Rc+(Tload \times Don)/(C \times 100)\} = Vo3$$

where "Vo" denotes a voltage (V) of said storage capacitor when there is no load current, "IC" denotes a current (A) of said storage capacitor, "Rc" denotes an internal resistance (Ω) of said storage capacitor, "Don" denotes a duty ratio (%) of a load, "C" denotes a capacity (F) of a storage capacitor, and "Vo3" denotes an amount of a voltage drop (V) of a storage capacitor voltage occurring during a burst period.

9. The power circuit according to claim 8, wherein said power source section comprises a secondary cell being connected between an output terminal and said negative polarity and being connected to a charging power source through a charging circuit, and of a primary cell being connected to said output terminal and said negative polarity through a charging preventing circuit used to prevent charging caused by an output from said charging power source.

10. The power circuit according to claim 8, wherein said power source section comprises a secondary cell being connected between an output of a charging circuit and said negative polarity and being connected to an output terminal through a charging preventing switch and of a primary cell being connected between said output terminal and said negative polarity.

11. The power circuit according to claim 8, wherein said power source section comprises a fuel tank, a fuel cell to generate power using fuel fed from said fuel tank, and a direct current smoothing controlling section to stabilize a voltage output from said fuel cell and to feed it to an output terminal.

12. The power circuit according to claim 8, wherein said power source section comprises a current setting resistor to set a value of an output current, an operational amplifier to amplify a detected voltage of said current setting resistor, and a switching circuit to control a power current according to an output of said operational amplifier.

13. The power circuit according to claim 8, wherein a storage capacitor in said energy storing section comprises an electric double layer capacitor.

14. The power circuit according to claim 13, wherein said storage capacitor has a capacitor discharging circuit used to cause a charge of said storage capacitor to be shorted through a discharging resistor when a predetermined relationship, determined by comparing a terminal voltage of said storage capacitor with a power voltage, exists.

15. A power circuit for feeding a load current to a load in which said load current repeats periodically and alternately a burst flow in a burst period and a non-burst flow in a non-burst period comprising:

a power source section made up of a direct current power source-having one terminal connected to a negative polarity;

a source power controlling section to control a current fed from a second terminal of said power source section connected to an input terminal to limit voltage drop in said power source section and to feed said current to a load connected to an output terminal;

an energy storing section having a storage capacitor connected between said output terminal and a negative polarity; and wherein said source power controlling section is provided with a current controlling circuit to control a resistance value of a detecting resistor section, said detecting resistor section having one terminal connected to an input terminal of said source power controlling section, according to a result of detection of a voltage input from said power source section, and a switching circuit which has a step-down DC—DC converter circuit comprising a voltage detecting circuit for detecting a voltage of an output terminal, a switching device and a coil connected in series between another terminal of said detecting resistor section and an output terminal, a capacitor connected between the output terminal and said negative polarity, and a diode connected between said negative polarity and a connection point between said switching device and said coil, and which controls a flowing period of an output current by exerting control on said switching device according to a control signal produced by detecting a change in an input current based on a voltage across said detecting resistor section, and a voltage at said output terminal; and wherein a circuit constant of said source power controlling section, electrostatic capacity and internal resistance of said storage capacitor are determined by following equations:

$$T1+T2 \leq Tload$$

where "T1+T2" denotes a flowing period (Sec) of a power current and "Tload" denotes a load period (Sec):

$$Vo/2 \geq IC \times \{Rc+(Tload \times Don)/(C \times 100)\} = Vo3$$

where "Vo" denotes a voltage (V) of said storage capacitor when there is no load current, "IC" denotes a current (A) of said storage capacitor, "Rc" denotes an internal resistance (Ω) of said storage capacitor, "Don" denotes a duty ratio (%) of a load, "C" denotes a capacity (F) of a storage capacitor, and "Vo3" denotes an amount of a voltage drop (V) of a storage capacitor voltage occurring during a burst period.

16. The power circuit according to claim 15, wherein said power source section comprises a secondary cell being connected between an output terminal and said negative polarity and being connected to a charging power source through a charging circuit, and of a primary cell being connected to said output terminal and said negative polarity through a charging preventing circuit used to prevent charging caused by an output from said charging power source.

17. The power circuit according to claim 15, wherein said power source section comprises a secondary cell being connected between an output of a charging circuit and said negative polarity and being connected to an output terminal through a charging preventing switch and of a primary cell being connected between said output terminal and said negative polarity.

18. The power circuit according to claim 15, wherein said power source section comprises a fuel tank, a fuel cell to generate power using fuel fed from said fuel tank, and a direct current smoothing controlling section to stabilize a voltage output from said fuel cell and to feed it to an output terminal.

19. The power circuit according to claim 15, wherein said power source section comprises a current setting resistor to set a value of an output current, an operational amplifier to amplify a detected voltage of said current setting resistor, and a switching circuit to control a power current according to an output of said operational amplifier.

20. The power circuit according to claim 15, wherein a storage capacitor in said energy storing section comprises an electric double layer capacitor.

21. The power circuit according to claim 20, wherein said storage capacitor has a capacitor discharging circuit used to cause a charge of said storage capacitor to be shorted through a discharging resistor when a predetermined relationship, determined by comparing a terminal voltage of said storage capacitor with a power voltage, exists.

22. A method for controlling a power circuit to feed a load current to a load, in which said load current repeats periodically and alternately a burst flow in a burst period and a non-burst flow in a non-burst period, which has a power source section made up of a direct current power source with one terminal connected to a negative polarity, a source power controlling section to control a current fed from said power source section, connected to an input terminal, and to feed said current to a load connected to an output terminal, and an energy storing section having a storage capacitor connected between said output terminal and a negative polarity, said method comprising:

a step of controlling a resistance value of a detecting resistor section, said detecting resistor section having one terminal connected to said negative polarity, according to a result of detection of a voltage input from said power source section; and a step of controlling a flowing period of an output current by exerting control on a switching device in response to a control signal produced by detecting a change in an input power voltage using a voltage value occurring at another terminal of said detecting resistor section, wherein said switching device is connected between an input terminal and an output terminal and a capacitor is connected between said output terminal and a negative polarity; and wherein a circuit constant of said source power controlling section, electrostatic capacity and internal resistance of said storage capacitor are determined by following equations:

$$T1+T2 \leq Tload$$

where "T1+T2" denotes a flowing period (Sec) of a power current and "Tload" denotes a load period (Sec):

$$Vo/2 \geq IC \times \{Rc+(Tload \times Don)/(C \times 100)\} = Vo3$$

where "Vo" denotes a voltage (V) of said storage capacitor when there is no load current, "IC" denotes a current (A) of said storage capacitor, "Rc" denotes an internal resistance ($\Omega$) of said storage capacitor, "Don" denotes a duty ratio (%) of a load, "C" denotes a capacity (F) of a storage capacitor, and "Vo3" denotes an amount of a voltage drop (V) of a storage capacitor voltage occurring during a burst period.

23. A method for controlling a power circuit to feed a load current to a load, in which said load current repeats periodically and alternately a burst flow in a burst period and a non-burst flow in a non-burst period, which has a power source section made up of a direct current power source having one terminal connected to a negative polarity, a source power controlling section to control a current fed from said power source section and connected to an input terminal of said source power controlling section, and to feed said current to a load connected to an output terminal of said source power controlling section, and an energy storing section having a storage capacitor connected between said output terminal and a negative polarity, said method comprising:

a step of controlling a resistance value of a detecting resistor section having one terminal connected to said negative polarity, according to a result of detection of a voltage input from said power source section; and a step of controlling a flowing period of an output current by exerting control on a switching device according to a control signal produced by detecting a change in a current of said switching device using a voltage value at another terminal of said detecting resistor section, and a voltage at said output terminal in a step-up DC—DC converter circuit comprising a coil and diode connected in series between an input terminal and an output terminal, a capacitor connected between said output terminal and a negative polarity, and a switching device connected between a connection point of said coil and said diode and said other terminal of said detecting resistor section; and wherein a circuit constant of said source power controlling section, electrostatic capacity and internal resistance of said storage capacitor are determined by following equations:

$$T1+T2 \leq Tload$$

where "T1+T2" denotes a flowing period (Sec) of a power current and "Tload" denotes a load period (Sec):

$$Vo/2 \geq IC \times \{Rc+(Tload \times Don)/(C \times 100)\} = Vo3$$

where "Vo" denotes a voltage (V) of said storage capacitor when there is no load current, "IC" denotes a current (A) of said storage capacitor, "Rc" denotes an internal resistance ($\Omega$) of said storage capacitor, "Don" denotes a duty ratio (%) of a load, "C" denotes a capacity (F) of a storage capacitor, and "Vo3" denotes an amount of a voltage drop (V) of a storage capacitor voltage occurring during a burst period.

24. A method for controlling a power circuit to feed a load current to a load, in which said load current repeats periodically and alternately a burst flow in a burst period and a non-burst flow in a non-burst period, which has a power source section made up of a direct current power source having one terminal connected to a negative polarity, a source power controlling section to control a current fed from said power source section connected to an input terminal of said power controlling section, and to feed said current to a load connected to an output terminal of said power controlling section, and an energy storing section having a storage capacitor connected between said output terminal and said negative polarity, said method comprising:

a step of controlling a resistance value of a detecting resistor section having one terminal connected to an input terminal according to a result of detection of a voltage input from said power source section; and a step of controlling a flowing period of an output current by exerting control on a switching device according to a control signal produced by detecting a change in an input current based on a voltage across said detecting resistor section, and a voltage at said output terminal of a step-down DC—DC converter circuit comprising a switching device and a coil connected in series between another terminal of said detecting resistor and an output terminal, a capacitor connected between the output terminal and said negative polarity, and a diode connected between a connection point between said switching device and said coil and said negative polarity; and wherein a circuit constant of said source power controlling section, electrostatic capacity and internal resistance of said storage capacitor are determined by following equations:

$$T1+T2 \leq Tload$$

where "T1+T2" denotes a flowing period (Sec) of a power current and "Tload" denotes a load period (Sec):

$$Vo/2 \geq IC \times \{Rc+(Tload \times Don)/(C \times 100)\} = Vo3$$

where "Vo" denotes a voltage (V) of said storage capacitor when there is no load current, "IC" denotes a current (A) of said storage capacitor, "Rc" denotes an internal resistance ($\Omega$) of said storage capacitor, "Don" denotes a duty ratio (%) of a load, "C" denotes a capacity (F) of a storage capacitor, and "Vo3" denotes an amount of a voltage drop (V) of a storage capacitor voltage occurring during a burst period.

* * * * *